3,328,588
APPARATUS FOR MEASURING THE EFFICACY OF AN AIR FILTER
Samuel B. Steinberg, 534 W. Franklin St., Baltimore, Md. 21201
Filed Dec. 10, 1963, Ser. No. 329,544
7 Claims. (Cl. 250—218)

This invention relates generally to measuring equipment, and more particularly it pertains to a method and apparatus for testing air filters.

Many present day industries require carefully purified air in large volume. For example, the "clean" rooms where fine equipment is manufactured must be ventilated and all dust, lint, and the like, must be avoided very carefully. Chemical plants and atomic energy installations are especially concerned with completely filtering the circulated air so as to avoid hazardous conditions.

It is an object of the present invention, therefore, to provide an apparatus and a method for testing the efficacy of air filters both from an initial installation standpoint and a maintenance basis.

A further object of this invention is to provide a complete particulate penetration apparatus for production testing the efficiency of particle filters in rapid succession with accuracy and in a non-hazardous manner.

In this respect, the invention contemplates the use of a cold smoke as opposed to the hot smokes heretofore used in such measurements and also the use of a negative pressure to drain the test smoke through the subject filter to more nearly simulate the conditions of use.

Another object of the invention is to provide a filter tester which more uniformly exposes the filter being tested to a standardized particle environment flow to give better control of the test.

Figure 1:
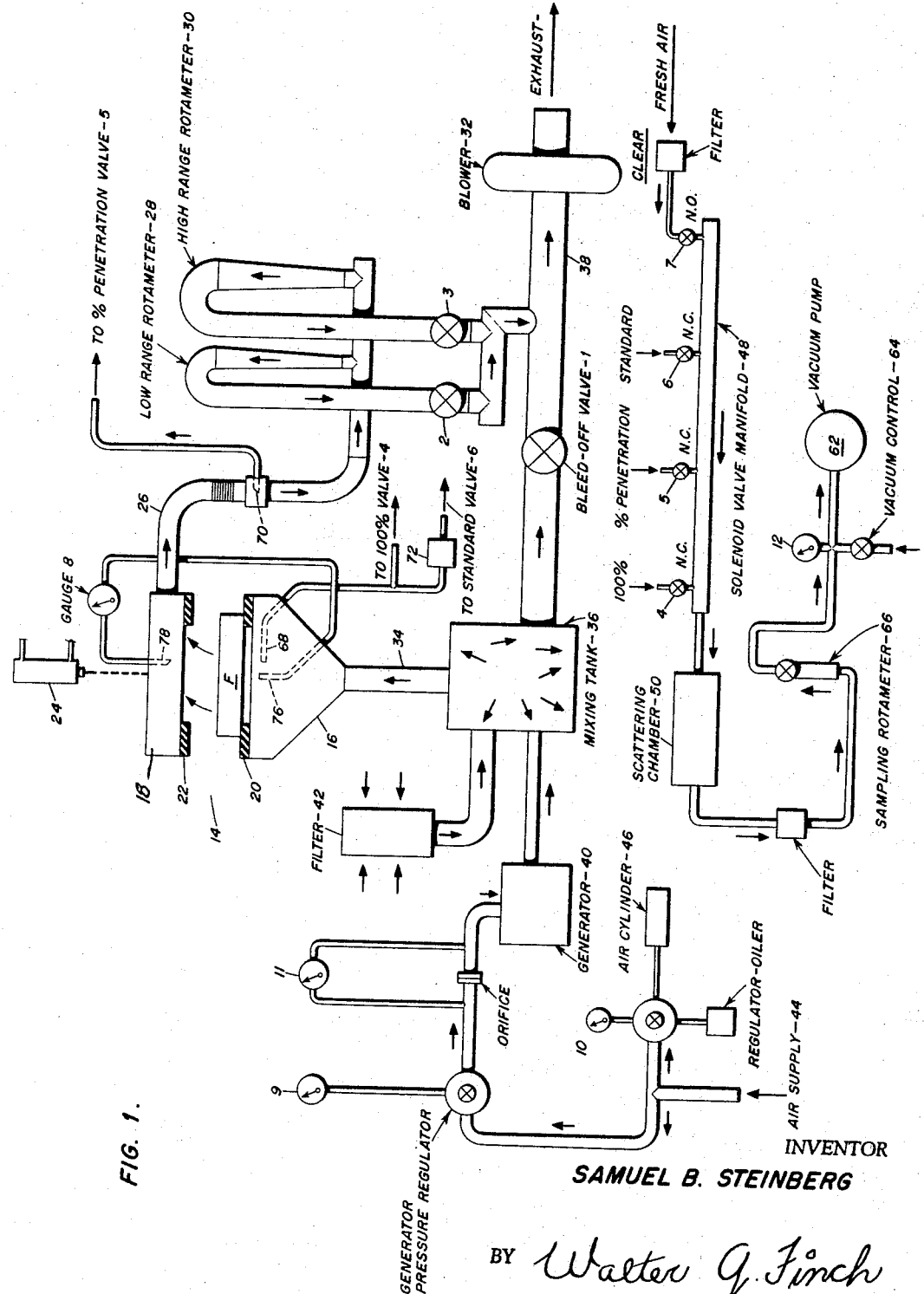
Figure 2:
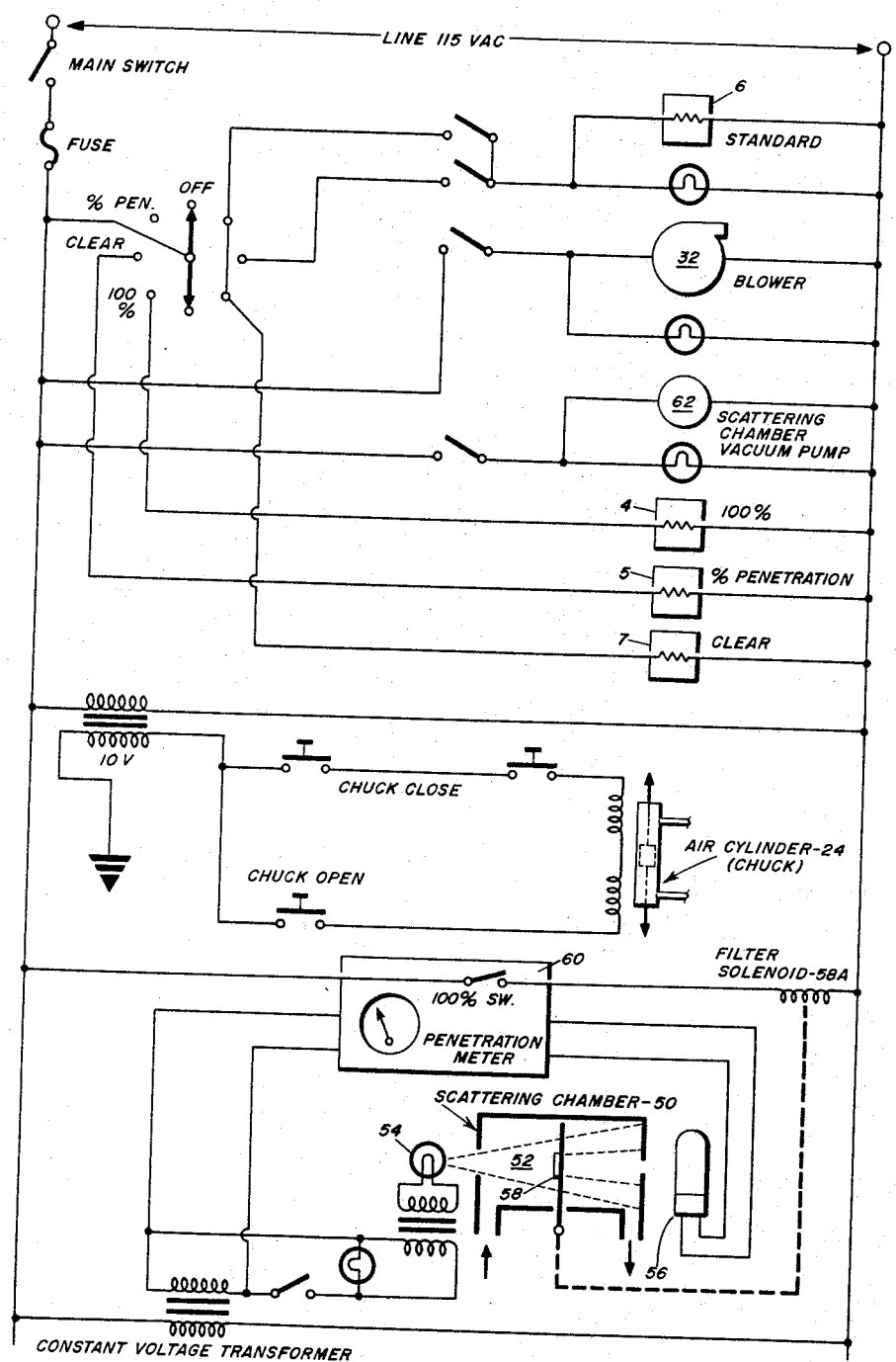

Other objects and attendant advantages of this invention will become more readily apparent and understood from the following detailed specification and accompanying drawings in which:

FIG. 1 is a schematic flow diagram of particulate penetration apparatus incorporating features of this invention; and FIG. 2 is a ladder diagram of the electrical connections for the particulate penetration apparatus and sampling apparatus of FIG. 1.

Referring now to the details of the drawings and particularly to FIG. 1, there is shown therein a test chuck 14 comprising a plenum chamber 16 and an upper opposing movable exhaust chamber 18. The registering faces of those chambers 16 and 18 are open and designed to mount various sizes of apertured plates 20 and 22 to suit the size of a filter F placed between them for testing its qualities.

The upper or exhaust chamber 18 is mounted on vertical slides and provided with a two-way air cylinder actuator 24 which can be electrically controlled to raise or lower the chamber to contact it with the filter F.

The exhaust chamber 18 has a flexible exhaust conduit 26 which connects to the lower ends of two rotameters 28 and 30. These rotameters 28 and 30 measure low and high rates of air flow, respectively, as selected by the opening of solenoid controlled valves 2 or 3 connected on their down-stream ends. The valves 2 and 3 discharge into the vacuum conduit of a motor driven exhaust blower 32.

The plenum chamber 16 is supplied through a conduit 34 with a cold smoke of aerosol-air mixture from a mixing tank 36 which can also be purged or regulated for pressure by means of a bleed-off valve 1 connected to the exhaust conduit 38 of the exhaust blower 32.

The aerosol or smoke generator 40 is the subject of my co-pending application in the U.S. Patent Office, Ser. No. 254,136 filed Jan. 28, 1963, entitled "Smoke Generator," now U.S. Patent No. 3,249,553.

The air for the smoke mixture is obtained from atmospheric air cleansed by a filter 42 attached to the mixing tank 36. The air for the smoke generator 40 is provided by an external pressurized air source 44 or from a storage air cylinder 46 which is replenished from the source as required and indicated by gauge 10.

The efficacy of the subject filter is determined by measurements of samples taken from the smoke mixture before and after passing therethrough. For this purpose the principle of smoke particle counting by measuring the light they reflect or "scatter" is employed.

The samples are collected, as illustrated in FIG. 1, by a solenoid valve manifold assembly 48 which discharges into a scattering chamber 50. As best shown in FIGS. 1 and 2, the scattering chamber 50 comprises an optically blackened cavity 52 through which the air sample flows, a cell light source or lamp 54 at one end and a phototube 56 at the other. A changeable optical filter 58 for attenuating the light in two steps and for preventing the direct rays of the cell lamp 54 from reaching the phototube 56 can be manipulated remotely by a filter solenoid 58A. Light scattered by the particles in the sample air however do reflect light into the phototube 56 resulting in a reading on a penetration meter 60 in amount proportional to their density.

The scattering chamber 50 with its solenoid valve manifold assembly 48 operates from its own vacuum pump 62. The vacuum and, hence, the flow through the chamber 50 is precisely adjusted by means including vacuum control 64, gauge 12 and sampling rotameter 66.

The apparatus operates as follows:

I. The percent penetration meter 60 is turned on and allowed a five-minute warmup time.

II. The blower 32 is then turned in and the proper flow range is selected, with either the high range rotameter 30 or low range rotameter 28, valves 3 or 2, respectively.

III. The flow is then adjusted with bleed-off valve 1.

IV. The smoke generator 40 is turned in and the flow is adjusted to the required amount by means of generator pressure gauge 9 and generator orifice gauge 11.

V. A filter is placed in the test chuck 14 on top of the plenum chamber 16 and the exhaust chamber 18 is moved down.

VI. The necessary adjustments are made to the percent penetration meter 60 to read 100% or zero percent. A sample probe 68 in the plenum chamber 16 and a sample probe 70 in the conduit 26 of the exhaust chamber 18 provide the respective air samples as solenoid valves 4 and 5 are opened by a select switch 80 in that order to feed the scattering chamber 50.

VII. The flow is now started through the subject filter F by closing the bleed-off valve 1 and the percent penetration is read directly on the meter 60 as residual particles passed flow through the scattering chamber 50.

VIII. The exhaust chamber 18 is then raised and the filter F is removed, with a new filter F being inserted and the test procedure is then repeated as outlined above.

To verify the operating level of the apparatus, a standard filter 72 of known particle retention may be cut in by the solenoid valve 6 and supplied by a probe 74 with 100% smoke from plenum chamber 16.

To purge the scattering chamber 50 and associated manifold assembly 48, a "clear" valve 7 is opened to admit filtered fresh air from the atmosphere. A gauge 8 connected with probes 76 and 78 before and after the subject filter F measures the pressure difference thereacross and hence its filter resistance.

Obviously many modifications and variations of the present invention are possible in light of the above

What is claimed is:

1. Apparatus for measuring the efficacy of an air filter, comprising, structure defining a pair of chambers each having an opening communicating one with the other, one chamber of said pair of chambers being slidably mounted with respect to the other of said pair of chambers, with said air filter being positioned between said opening in each said chambers, a smoke generator supplying a smoke medium to one of said pair of chambers, pump means passing said smoke medium from said one chamber through said air filter and into the other of said pair of chambers, and means for sampling a portion of said smoke medium in both said chambers and determining the efficacy of said air filter thereby.

2. The apparatus as recited in claim 1, wherein said supplying means includes a tank for mixing smoke supplied by said smoke generator with fresh filtered air.

3. The apparatus as recited in claim 1, wherein said sampling and determining means includes a scattering chamber having its inlet in selective communication with said one chamber of said pair of chambers and said other chamber of said pair of chambers.

4. The apparatus as recited in claim 3, wherein a suction pump is provided for alternately passing said smoke medium from both said pair of chambers through said scattering chamber.

5. The apparatus as recited in claim 1, wherein said sampling and determining means includes structure defining a cavity having non-reflecting walls and an inlet and outlet passage at opposite ends of said cavity for selectively passing said smoke medium in both said pair of chambers through said cavity, photo tube and light source means positioned adjacent said opposite ends of said cavity, means spaced from said walls of said cavity for controlling the amount of direct illumination reaching said photo tube from said light source, whereby illumination from said light source is reflected by said smoke medium to reach said photo tube in an amount corresponding to the amount of its presence, and means indicating the amount of illumination received by said photo tube by said reflection.

6. The apparatus as recited in claim 5, wherein said structure defining a cavity is provided with a manifold having its inlets valved and selectively communicating with fresh filtered air, the smoke medium contained in said one chamber of said pair of chambers, and the smoke medium contained in said other chamber of said pair of chambers.

7. The apparatus as recited in claim 1, wherein said smoke medium is a cold smoke medium.

References Cited
UNITED STATES PATENTS

| | | | |
|---|---|---|---|
| 1,969,627 | 8/1934 | Simon et al. | 88—14 |
| 2,790,253 | 4/1957 | Ayer. | |
| 2,857,756 | 10/1958 | First | 73—38 |
| 3,011,387 | 12/1961 | Johnson | 250—218 X |

RALPH G. NILSON, *Primary Examiner.*

J. D. WALL, *Assistant Examiner.*

Disclaimer 3,328,588.—*Samuel B. Steinberg*, Balimore, Md. APPARATUS FOR MEASURING THE EFFICACY OF AN AIR FILTER. Patent dated June 27, 1967. Disclaimer filed Nov. 19, 1974, by the assignee, *Air Techniques, Inc.*

Hereby enters this disclaimer to claims 1–7 of said patent.

[*Official Gazette May 20, 1975.*]